Aug. 4, 1964     O. THOMA ETAL     3,142,964
HYDRAULIC APPARATUS

Filed Jan. 31, 1963                    2 Sheets-Sheet 1

INVENTORS
OSWALD THOMA +
BY EDWARD V. WARD

Reynolds + Christensen
ATTORNEYS

Aug. 4, 1964   O. THOMA ETAL   3,142,964
HYDRAULIC APPARATUS
Filed Jan. 31, 1963   2 Sheets-Sheet 2
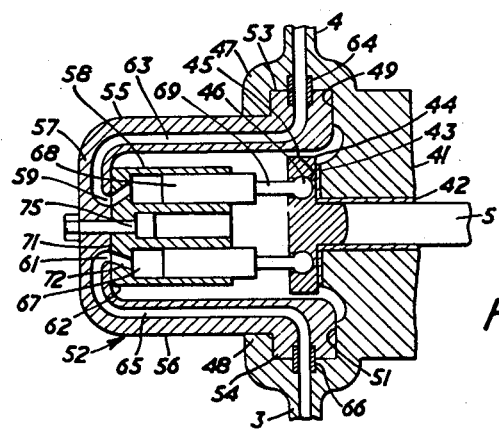
FIG. 7.
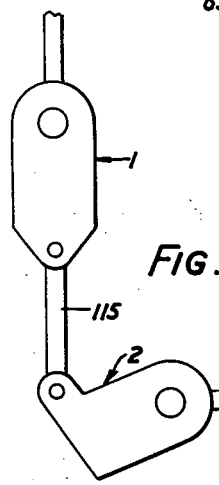
FIG. 8.
FIG. 9.
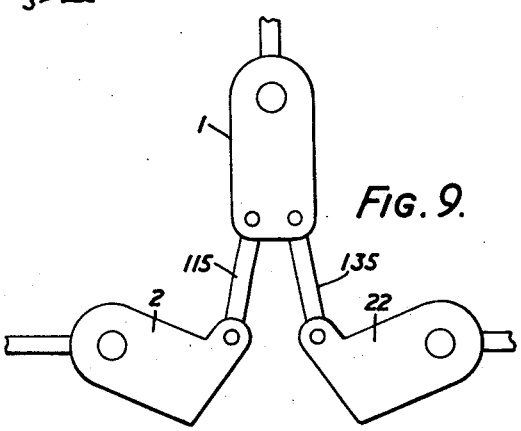
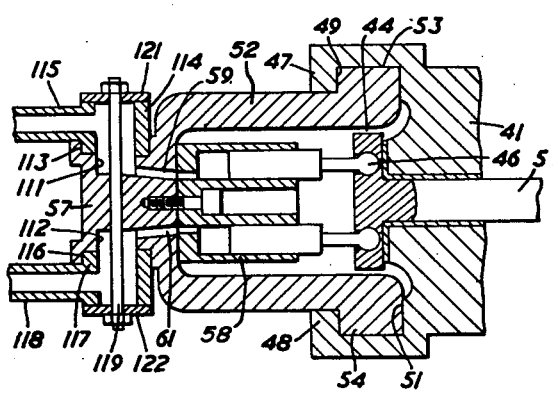
FIG. 10.
INVENTORS
OSWALD THOMA &
BY EDWARD V. WARD
Reynolds + Christensen
ATTORNEYS United States Patent Office 3,142,964
Patented Aug. 4, 1964

3,142,964
HYDRAULIC APPARATUS
Oswald Thoma, Charlton Kings, Cheltenham, and Edward Victor Ward, Cheltenham, England, assignors to Dowty Hydraulic Units Limited, Ashchurch, England, a British company
Filed Jan. 31, 1963, Ser. No. 255,256
Claims priority, application Great Britain Mar. 7, 1962
22 Claims. (Cl. 60—53)

This invention relates to hydraulic apparatus, more particularly to a hydraulic power transmission comprising a tilting head hydraulic pump unit in hydraulic connection with a tilting head hydraulic motor unit in which displacements of the pump unit and motor unit are continuously variable to define a continuously variable speed ratio and torque ratio between the pump unit and the motor unit.

A tilting head pump or motor unit comprises a fixedly positioned rotary drive shaft having a head secured thereto for angular tilt movement about a tilt axis disposed transversely to the drive shaft axis, hydraulic displacement of the unit being adjustable by adjustment of the angular tilt of the head. The head includes piston and cylinder means by which hydraulic displacement is obtained during rotation of the drive shaft. Such a tilting head pump or motor unit will be referred to hereinafter as a tilting head pump unit or a tilting head motor unit depending on its intended use as a pump or motor.

More specifically, the present invention is concerned with a hydraulic power transmission having a pump and at least one motor unit each of the tilting head kind, and each comprising a fixedly positioned rotary member or drive flange secured to a drive shaft, and a head tiltable about a tilt axis disposed diametrally of the drive flange. Each head comprises a yoke, frame, or casing containing a rotary cylinder block, a rotary drive means between the drive flange and the cylinder block, and pistons associated with the cylinder block and arranged for reciprocation whenever the head is tilted during rotation of the rotary member. The tilt angle of the head's rotary axis relatively to the rotation axis of the rotary member determines the effective stroke of the pistons in their cylinders, and the ratio of the displacement of the pump relative to the displacement of the motor determines their relative speed and the torque transmitted. A valve means contining a pair of ports is used for the supply and return flow of liquid to and from the cylinders. The rotational axes of the pump's rotary member and the motor's rotary axes are, according to this invention, nonaxially disposed, but their respective tilting heads are mechanically linked together so that they tilt correspondingly. Also according to this invention two or more motor units may be linked to one pump unit, the motor units being all disposed in like relationship to the pump unit.

The object of the present invention is to provide an improved hydraulic power transmission having tilting head pump and motor units, with their respective drive axes non-coaxial, they being coaxially related in application Serial No. 230,893, filed October 16, 1962.

In accordance with the present invention a hydraulic power transmission comprises a tilting head pump unit and a tilting head motor unit relatively arranged in a support such that the axes of the drive shafts of the pump and motor units are in a non-coaxial relation to one another, and a rigid link of invariable length pivotally connected to the pump head at a position spaced from its tilt axis and pivotally connected to the motor head at a position spaced from its tilt axis such that pump and motor heads can move only simultaneously about their tilt axes. Preferably the arrangement is such that at or near the zero displacement position of the pump head the motor head is at the maximum displacement about its tilt axis permitted by the link, this maximum angular displacement corresponding to maximum motor unit displacement.

In referring to the axes of the respective drive shafts as non-coaxial it is intended to include as part of this invention a relation such that the axes are parallel but do not intersect, or a relation such that they are inclined and do intersect, or a relation such that they are skewed and do not intersect. The word "axis" as used herein has reference to an imaginary straight line of infinite length, about which tilting or rotational movement occurs. The invention herein concerns this non-coaxial relationship of the drive axes.

The tilt axes of the tilting head pump and motor head may be (and are shown herein as) disposed parallel to one another and at the position of maximum motor displacement the two pivotal connections of the link may lie in one plane which includes the pump unit tilt axis. This latter is the subject-matter of Serial No. 230,893 referred to above. This arrangement will ensure that the motor unit may be in the maximum displacement position when the pump is in the zero displacement position. In this arrangement the drive shafts of the two units may be inclined to one another, that is to say, relatively angularly disposed.

In accordance with a further feature of the invention one tilting head pump unit and two tilting head motor units may be provided in hydraulic connection one with the other, the two motor units being so mounted that their drive shafts extend coaxially in opposite directions, although not coaxial with the pump unit drive shaft, and at least two links being provided interconnecting the heads of the units at positions spaced from their tilt axes such that angular movement of the pump head causes substantially similar movements of the motor heads and so that at one angular position of the pump head corresponding substantially to its zero displacement position each motor head is maintained at a maximum tilt angle corresponding to its maximum displacement. Preferably two links are provided extending from pivotal connections on the pump head to pivotal connections one on each motor head in such manner as to ensure substantially similar movements of the motor heads.

It is prefered that the two motor units should be hydraulically connected in parallel one with the other and with the pump in order that a differential gear effect may be obtained between the drive shafts of the two motors i.e. for any angular setting of pump and motor heads the sum of the rotational speeds of the motor drive shafts is proportional to the flow rate of liquid delivered from the pump. A clutch may be provided operative between the two motor drive shafts to lock them mechanically together when it is desired to eliminate the differential gear effect.

Four embodiments of the invention for use on vehicles in the transmission of power from the vehicle engines to ground engaging wheels will now be described with reference to the accompanying drawings in which:

FIGURE 1 diagrammatically illustrates the first embodiment,

FIGURE 7 is a cross-section through a pump or motor unit as used in either of the embodiments described in FIGURES 1 to 6, FIGURES 8 and 9 diagrammatically illustrate the third and fourth embodiments, with parts in the position wherein the pump unit's displacement is zero, and, FIGURE 10 is a cross-section through a pump or motor unit usable in either the FIGURE 8 or FIGURE 9 embodiments.

Figure 1:
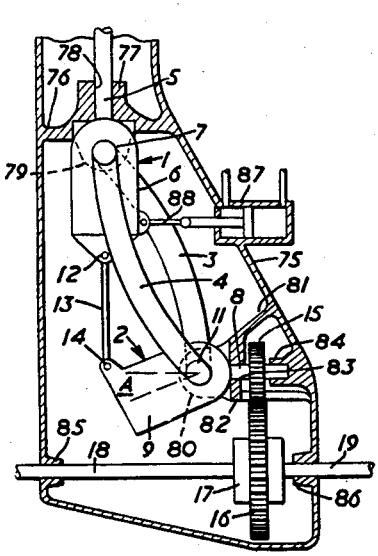

Referring initially to FIGURE 1 the transmission comprises a pump 1 and a motor 2 both of which are hydraulically connected together by means of a pair of pipe lines 3 and 4. The pump and motor are both of the tilting head type. The pump comprises a drive shaft 5 fixedly positioned for rotation in a bearing housing 77 (see FIGURE 7) and a tilting head unit 6 supported in the bearing housing 77 to tilt about a tilt axis that extends diametrally of the drive shaft 5 by means of trunnions indicated diagrammatically at 7. Within the head unit 6 a rotary cylinder block and cylinders are provided substantially as described with reference to FIGURE 7. Rotation of the drive shaft 5 will cause hydraulic displacement within the pump 1 at a rate dependent on the angular displacement of the head 6 about the tilt axis defined by the trunnions 7. As shown in FIGURE 1 the head 6 is in the angular position corresponding to zero displacement of the pump, wherein its rotational axis coincides with the axis of drive shaft 5.

The motor 2 is of similar construction to the pump 1 and the construction is therefore substantially as illustrated in FIGURE 7. The motor 2 includes a drive shaft 8 carried by a bearing 82 (FIGURE 7) and a tilting head unit 9 secured by trunnions 11 to the bearing housing of the drive shaft 8. The hydraulic connections 3 and 4 extend between the trunnions 7 and 11.

At the end of the head unit 6 of the pump 1 distant from trunnions 7 a pivotal connection 12 is formed to which is connected a rigid link 13 of invariable length. At its opposite end this link 13 is connected to a pivotal connection 14 mounted at the end of the motor head unit 9 remote from the trunnions 11.

Figures 2, 3:
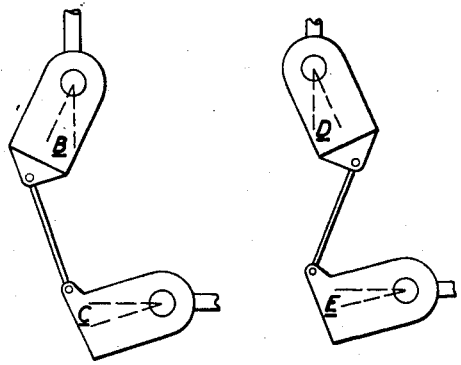
FIGURES 2 and 3 illustrate diagrammatically the limits of angular movement in the FIGURE 1 embodiment.

A transmission as shown in FIGURE 1 is intended for use on a vehicle such as an agricultural tractor, the engine being connected to rotate the pump drive shaft 5 whilst the motor output shaft 8 is connected to rotate the rear wheels. For this purpose the motor shaft 8, by way of example, carries a spur gear 15 which is in engagement with a larger spur gear 16. The larger gear 16 is connected to drive a differential gear 17 from which half shafts 18 and 19 extend to the rear ground engaging wheels (not shown) of the tractor. The differential gear 17 performs the normal function of permitting differential ground wheel speeds. In FIGURE 1 the transmission is shown in the neutral condition in which the pump head 6 is at zero displacement whilst the motor head 9 is displaced to the maximum angle permitted by the link 13 from alignment with the axis of the drive shaft 8, i.e. to the maximum motor displacement position. This angle is indicated by the reference A. For forward movement of the tractor the pump head 6 is displaced to the left toward the position shown in FIGURE 2. The initial movement will cause displacement of liquid from the pump to the motor at a small rate and at substantial pressure which by virtue of the fact that the motor is at maximum displacement will cause maximum torque to be developed in the motor drive shaft 8, which in turn will cause the tractor to exert a substantial tractive effort. Increased tilting movement of the head 6 will reduce the angular displacement of the motor head 9 thus increasing the speed ratio of the transmission. For forward maximum speed ratio the maximum angle of the pump head is indicated in FIGURE 2 at B. This corresponds to a minimum angle C for the motor tilting head. Thus as shown in FIGURE 2 the transmission speed ratio will be a maximum in the forward direction.

For reverse propulsion of the tractor, pump head 6 is moved to the right as seen in the drawing towards the position shown in FIGURE 3. Initial movement will cause small displacement of liquid at high pressure from the pump to the motor which by virtue of the maximum displacement of the motor will cause a maximum reverse torque to be developed at the motor drive shaft 8. In this way a maximum tractive effort in the reverse direction may be exerted by the tractor. The pump head 6 may be moved to a maximum angle D for reverse propulsion and in so doing the link 11 reduces the motor head angle to a value E. This will give a maximum reverse speed ratio. The maximum forward and reverse speed ratios are not necessarily similar, and as shown, the reverse angle E is less than the forward angle C.

It will be seen in the neutral position shown in FIGURE 1 that the centres of the pivots 12 and 14 lie in a plane which passes through the axis of trunnions 7. This will ensure that the pivot 14 is at its greatest distance from the trunnions 7 which will cause the greatest possible angular displacement of the motor head 9. Movement of the pump head 6 in either direction, either for forward or for reverse propulsion, can only cause the pivot 14 to come closer to the trunnion axis 7 and thus reduce the angle of the pump head 9.

Figure 4:
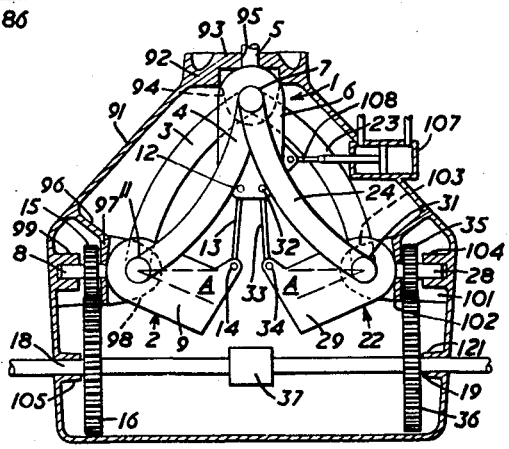
FIGURE 4 illustrates diagrammatically the second embodiment, employing two motor units.
Figure 5:
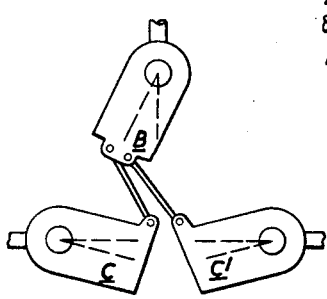
FIGURES 5 and 6 illustrate diagrammatically the limits of angular movement of the embodiment of FIGURE 4.
Figure 6:
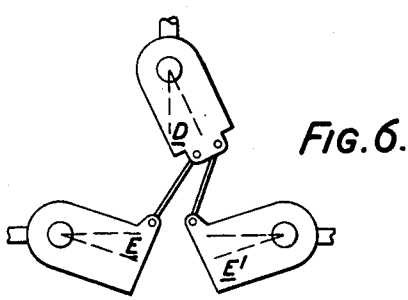

Reference is now made to the second example shown in FIGURES 4, 5, and 6. Again this example is intended for use in the propulsion of a vehicle such as a tractor. In FIGURE 4 a pump 1 includes a drive shaft 5 driven by the tractor engine and carries a tilting head 6 for movement about trunnions 7 as described with reference to FIGURE 1. Two motors are provided indicated for convenience at 2 and 22. The motor 2 includes head 9 mounted on trunnions 11 for movement about a tilt axis extending transversely to the axis of the motor drive shaft 8. Similarly the motor 22 includes tilting head 29 for movement on trunnion 31 about an axis transverse to the motor drive shaft 28. A pivotal connection 12 on the pump head 6 carries a rigid link 13 of invariable length which extends to a pivot 14 on the motor head 9. The pump head 6 also includes a further pivot 32 from which extends a further rigid link 33 of invariable length to a pivot 34 on the motor head 29.

The drive shafts 8 and 28 of the motors 2 and 22 are axially aligned and are carried in suitable bearings 97, 99 and 102, 104 respectively, the common axis of these drive shafts being at right angles to the axis of the pump drive shaft 5. Each of the shafts 8 and 28 carries a spur gear respectively 15 and 35 in mesh with larger spur gears 16 and 36. From the gears 16 and 36 half shafts 18 and 19 extend to the respective rear ground engaging wheels of the tractor.

A pair of hydraulic pipes 3 and 4 extend between pump 1 and the motor 2 and a further pair of pipes 23 and 24 extend between the pump 1 and the motor 29. These pipes are so arranged that pump 1 and the motors 9 and 29 are hydraulically connected in parallel with one another. This arrangement will ensure that a differential gear effect is obtained between the motor shafts 8 and 28. This in turn will provide a differential gear effect between the half shafts 18 and 19. A clutch 37 is provided between the two gears 16 and 36, this clutch normally being disengaged to permit differential action between the shafts 18 and 19 and being capable of engagement to lock the two shafts together when a differential action is not desired or required.

In the neutral position as shown in FIGURE 4 the pivot connections 12 and 14 of the link 13 lie in a plane passing through the axis of the trunnions 7. Also the pivot connections 32 and 34 lie in another plane passing through the axis of the trunnions 7. This arrangement ensures that for both motor heads 9 and 29 there is a maximum angle with the axis of the drive shafts 8 and 28 corresponding to the angle A in FIGURE 4. For forward movement the pump head 6 is moved to the left (see FIGURE 5), such movement causing displacement of hydraulic liquid through the pipes into the two motors to cause rotation of the drive shafts 8 and 28. Initial movement at the pump head will cause displacement of a small flow rate of liquid only at high pressure to the motors when substantially at their maximum displacement position, thus causing maximum torque to be developed at the motor shafts 8 and 28. The torques developed will be substantially equal to one another. Due to the differential effect the speeds of the shafts 8 and 28 may be the same or may vary considerably. The maximum movement of the pump extends to the angle B illustrated in FIGURE 5 for forward propulsion and in this condition the angles of the motor heads are reduced to the angles C and C'. These angles are not exactly equal because the links as shown in FIGURE 5 are not quite symmetrical. However, the difference may be made quite small and the fact that the motors are hydraulically in parallel will accommodate any slight difference in displacement of two motors. Also under these conditions the motors will be operating in a low torque high speed condition in which a small difference in the torque exerted by the two motors will not have any noticeable disadvantageous effect in the propulsion of the tractor. It is emphasized however that where maximum torque is required on the motor drive shafts the pump is only slightly displaced from its zero displacement position and the two motor displacements are substantially equal thus giving substantially equal torque on the ground engaging wheels of the tractor.

For reverse propulsion the pump unit 4 is moved to the right, as in FIGURE 6, and at its maximum displacement position the pump head unit is moved to an angle D relative to the pump drive shafts. The comments made above regarding the torque exerted at different stages during forward propulsion apply equally to reverse propulsion, although not necessarily by equal values for any given angular increment of the pump's tilt angle from its neutral position.

In the two described embodiments of FIGURES 1 to 6 the links have been indicated as of a solid nature performing only the mechanical function of interconnecting pump and motor heads. It is, however, within the scope of this invention that each link should include one or more hydraulic passages to facilitate transfer of hydraulic liquid between pump and motor.

Reference is now made to FIGURE 7 of the accompanying drawings which shows by way of example a cross-section through a tilting head pump or motor unit. The unit shown could serve either as pump or as motor in either of the embodiments of the present invention described with reference to FIGURES 1 to 6. For convenience, however, it will be assumed that the unit as shown in FIGURE 7 is the pump used in either of the two previously described embodiments of the invention. The pump drive shaft 5 is carried in a drive shaft bearing housing 41 by means of radial and end thrust bearings 42 and 43. Internally of the pump the drive shaft 5 terminates in an integrally formed drive flange 44. Around the drive flange a plurality of sockets 45 are located for the reception of ball joints 46. A pair of lugs 47 and 48 extend from the bearing housing 41 one on either side of the drive flange 44. Interiorly of the lugs 47 and 48 a pair of cylindrical recesses respectively 49 and 51 are formed both of which open towards the drive flange 44. The recesses 49 and 51 are coaxial and the common axis passes through the drive flange 44 as a diameter of the circle containing the centres of the ball joints 46.

A yoke 52 is mounted for tilting movement in the recesses 49 and 51 by means of a pair of trunnions 53 and 54 which are an accurate fit in the bores or recesses 49 and 51. The trunnions 53 and 54 are carried at the ends of arms 55 and 56 of the yoke. The base 57 of the yoke forms a valve plate on which a cylinder block 58 is mounted for rotation. Within the valve plate 57 a pair of ports 59 and 61 are located which open into the valve surface 62 of the valve plate. From the port 59 a passage 63 extends through the arm 55 to the trunnion 53 where by means of a rotating seal 64 it makes connection with the pipe 4 extending to the motor unit. The pipe 4 is fixedly secured to the lug 47. Similarly from the ports 61 a passage 65 extends through the arm 56 of the yoke to the trunnion 54 where by means of a rotating seal 66 it makes connection with a fixed pipe 3 also extending to the motor unit.

Within the cylindrical block 58 a plurality of cylinders 67 are formed whose axes are parallel to the axis of cylinder block rotation. These cylinders are equidistantly placed around the cylinder block. Within each cylinder 67 a piston 68 is located which extends from the end of the cylinder block adjacent to the drive flange 45. Within each piston a connecting rod 69 is secured by means of an articulated joint, each connecting rod having a limited degree of angular movement permitted within its associated piston. Each connecting rod 69 terminates in the drive flange at a ball joint 46 received in its socket 45.

The end of the cylinder block 58 remote from the drive flange 45 is formed as a valve surface 71 within which are formed a plurality of cylinder ports 72 extending one from each cylinder to the valve surface 71. The ports 72 co-operate during cylinder block rotation with the ports 59 and 61. The cylinder block 58 is located for rotation on the valve plate by means of a fixed shaft 75 carried by the valve plate 57.

The yoke 52, the cylinder block 58 and pistons 68 together form the tilting head of the pump unit. As shown in FIGURE 7 the tilting head occupies an angular position in the trunnion bearings 51 such that the rotation axis of cylinder block 58 is coaxial with the rotation axis of drive shaft 5. This position corresponds to the zero displacement position of the pump. In order to cause the pump to deliver liquid the tilting head is moved angularly in the trunnion bearings 49, 51 so that the axis of the cylinder block 58 becomes inclined to the axis of the drive shaft 5. During rotation of the drive shaft 5 and cylinder block 58 the pistons 68 will then reciprocate in their cylinders 58 and will draw liquid in from one of the ports 59 or 61 and drive it out at the other of these ports. The actual stroke of the pistons 68 will increase with increasing angular deflection of the tilting head from the zero displacement position shown in FIGURE 7. Rotation of the drive shaft 5 will cause rotation of the cylinder block 58 by virtue of engagement of connecting rods 69 within their pistons 68.

For operation of the unit shown in FIGURE 7 as a pump it will be appreciated that the tilting head is always in a condition where the rotation axis of the cylinder block 58 is inclined more or less to the rotation axis of the drive shaft 5. Supply of pressure liquid to one or the other of the ports 59 or 61 will urge pistons 68 which are subjected to pressure liquid in an outward direction which will cause joint rotation of cylinder block 58 and drive shaft 5. Pistons receiving pressure liquid will move outwardly and at the end of their outward stroke will transfer from one to the other of the ports 59 and 61 operating at a lower pressure. Inward movement of the pistons will then occur displacing liquid at low pressure.

In the two transmissions described with reference to FIGURES 1 to 6 the mounting of the pump and motor units in their correct relative positions has not yet been discussed. From FIGURE 7 it will be clear that both pump and motor units are each secured in position by means of their drive shaft bearing housing. In the FIGURE 1 embodiment of the invention a support is formed by a casing 75 to locate pump and motor units in their correct relative positions. Within casing 75 a flange 76 is integrally formed to support the bearing housing 77 of the pump unit. This housing includes a bore 78 forming the bearing for pump drive shaft 5. Integrally formed with the housing are a pair of lugs 79 which form trunnion bearings to locate the pump head 6 for tilt movement. The casing also includes an integrally formed member 81 carrying motor drive shaft bearing housing 82 having a bore 83 within which the motor drive shaft is rotatably mounted. The housing 82 includes a pair of lugs 80 which form the trunnion bearings to locate the motor head 6. A further bearing housing 84 integrally formed with the casing 75 locates the end of shaft 8 for rotation in order to give adequate support for the gear 15. The half shafts 18 and 19 are also carried by bearing housing 85 and 86 formed in the casing 75. For adjustment of the tilt angle of the pump and motor heads a hydraulic servomotor 87 is secured to the casing 75 and is connected by a pivoted link 88 to the pump head 6. Movement of the pump head 6 as previously described will cause movement of the motor head 9. The hydraulic servomotor 87 may be controlled in any convenient manner.

In the embodiment of the invention disclosed in FIGURE 4 a casing 91 forms the support for the pump and the motor units. Within the casing 91 a flange 92 is integrally formed with the bearing housing 93 of the pump, this bearing housing including trunnions 94 by which the pump head 6 is mounted for tilt movement. The housing 93 also includes a bore 95 forming the bearing for the pump drive shaft 5. A member 96, integrally formed in the casing 91, carries the bearing housing 97 of the motor 2. Lugs 98 extending from the bearing housing 97 form trunnion bearings to locate the motor head 9. A bearing housing 99 integrally formed with the casing 91 locates the outer end of the motor drive shaft 8. A member 101 integrally formed with the casing 91 carries the bearing housing 102 of the motor unit 22. From this housing lugs 103 project to form trunnion bearings for the motor head 29. A bearing housing 104 integrally formed with the casing 91 locates the outer end of the motor drive shaft 28. Bearing housings 105 and 121 in the casing 91 carry the half shafts 18 and 19. A hydraulic servomotor 107 supported by the casing 91 is connected by means of a pivoted link 108 to the pump head 6, movement of the servomotor adjusting in the manner previously described the tilt positions of pump head 6 and the motor heads 9 and 29.

Reference is now made to the embodiments of FIGURES 8, 9 and 10. These embodiments resemble the embodiments of FIGURES 1 and 4 with the difference that one or more hydraulic connections between pump and motor extend through the link between pump and motor. An essential difference in the construction of pump or motor units from that of FIGURE 7 is illustrated in FIGURE 10. Where possible similar reference numerals to those used in FIFURE 7 will be used. As in FIGURE 7 the drive shaft 5 is carried in a bearing housing 41 and is integrally formed with a drive flange 44 carrying ball joints 46. Also the cylinder block 58 is carried in a yoke 52 pivotally connected by trunnions 53 and 54 to bores or recesses 49 and 51 in lugs 47 and 48 of the bearing housing 41. The trunnions however do not form liquid connections. In this case the liquid connections are formed on the base of the yoke, remote from the trunnions. For this purpose two coaxial bores 111 and 112 extend inwardly from opposite sides of the yoke base, the axis being parallel to the trunnion axis. The port 59 opens into the bore 111 and port 61 opens into bore 112. A concentric recess 113 is formed around the open end of bore 111 to receive a hollow spigot 114 formed at one end of a hollow link 115. Similarly, a concentric recess 116 is formed at the open end of bore 112 to receive a hollow spigot 117 formed at one end of a hollow link 118. A bolt 119 extends coaxially through both bores 111 and 112 locates end closure caps 121 and 122 against the open ends of spigots 114 and 117 to hold them in position in their recesses 113 and 116 and to close the outer end of the passages. Suitable seals are provided at all mating surfaces to ensure a leak proof flow passage from port 59 into link 115 and a leak proof flow passage from port 61 into hollow link 118.

In FIGURE 8 pump 1, motor 2 and a connecting link only are shown, the arrangement of casing, gears and other parts being as shown in FIGURE 1. The links 115 and 118 (the latter not visible) interconnect pump 1 and motor 2 in FIGURE 8 and act in the mechanical sense exactly as the link 13 of FIGURE 1 by reason of the engagement of spigots 114 and 117 in their recesses. The links 115 and 118 also perform the function of the hydraulic pipes 3 and 4 of FIGURE 1 by conveying flow and return liquid between pump and motor.

The operation of the FIGURE 8 embodiment is exactly as described for the FIGURE 1 embodiment with the exception that liquid flows through the mechanical links.

The FIGURE 9 embodiment is arranged with pump 1, motors 2 and 22, casing, gears and other parts exactly as described for FIGURE 4. The difference lies only in the fact that the links are arranged also to carry hydraulic liquid between pump and motor so that the pipes 3, 4, 13 and 24 of FIGURE 4 do not need to be provided. The pump 1 in FIGURE 9 includes two sets of hydraulic connections in the yoke base each set being arranged as shown in FIGURE 10. These sets of connections are arranged side by side with their axes parallel. Two pair of links indicated at 115 and 135 in FIGURE 9 extend from the pump 1 respectively to the motors 2 and 22. The links are arranged so that, hydraulically, the pump and motors are connected in parallel.

The mechanical operation of the links will cause operation of the FIGURE 9 embodiment exactly in the manner described for FIGURE 4.

In all described embodiments the axes of pump and motor drive shafts have been shown inclined at right angles to one another, hence non-coaxial. It is within the scope of the present invention for pump and motor to be relatively placed so as to have any other inclination one to the other. If the axes are inclined to one another they will intersect. It is however further within the scope of the present invention for pump and motor to be relatively placed so that their drive shaft axes are either parallel or in skewed relation, i.e. such that the drive shaft axes are in spaced relation, and in all such relations are correctly described as non-coaxial, in that respect differing from the showing in Serial No. 230,893.

We claim as our invention:

1. A hydraulic power transmission comprising a tilting head pump unit, a tilting head motor unit, at least one hydraulic connection between pump and motor, support, shaft bearing means in the support within which drive shafts of the pump and motor units are rotatably mounted, trunnion bearing means in the support within which the heads of pump and motor units are tiltably mounted, a rigid link of invariable length pivotally connected to the pump head at a position spaced from its tilt axis and pivotally connected to the motor head at a position spaced from its tilt axis so that pump and motor heads may only move simultaneously, and means for adjusting the heads about their tilt axes, the shaft bearing means being so arranged that the axes of the shafts are in non-coaxial relation one to the other, and the pivotal connections of the link being so arranged that when the pump head is in its maximum displacement position the motor head is at a minimum displacement position, greater than zero displacement.

2. A hydraulic power transmission comprising a tilting head pump unit, a pair of tilting head motor units, at least one hydraulic connection interconnecting the pump unit with each motor unit, a support, shaft bearing housings in the support within which the drive shafts of pump and motor units are rotatably mounted, trunnion bearing housings in the support within which the heads of pump and motor units are tiltably mounted, a rigid link of invariable length pivotally connected to the pump head at positions spaced from its tilt axis and pivotally connected to one motor head at positions spaced from its tilt axis, a second rigid link of invariable length pivotally connected to the pump head at a position spaced from its tilt axis and pivotally connected to the head of the other motor unit at a position spaced from its tilt axis so that pump and motor heads may only move simultaneously, and means for adjusting the heads about their tilt axes, the shaft bearing housings of the two motors being such that the shafts are coaxial and extend in opposite directions and the shaft bearing housing of the pump being so arranged that the axis of the pump drive shaft is in a non-coaxial relation to the motor drive shaft axis.

3. A hydraulic power transmission as claimed in claim 2 wherein the pivotal connections of the links are so arranged that when the pump head is in its zero displacement position the motor heads are at or near the maximum displacement positions permitted by the links.

4. A hydraulic power transmission as claimed in claim 3 wherein the trunnion bearing housing maintain the tilt axes of the pump and the motor units parallel one to the other, the two pivotal connections of one link lie in a plane passing through the pump tilt axis in the zero displacement position of the pump, and the two pivotal connections of the other link lie in a plane passing through the pump tilt axis in the zero displacement position of the pump.

5. A hydraulic power transmission as claimed in claim 2 wherein the hydraulic connection is so arranged that the two motor units are hydraulically connected in parallel with the pump unit.

6. A hydraulic power transmission as claimed in claim 5 including clutch means capable when desired of mechanically interconnecting the motor drive shafts.

7. A hydraulic power transmission as claimed in claim 1 wherein the link forms a hydraulic connection between pump and motor.

8. A hydraulic power transmission as claimed in claim 1 wherein the trunnion axes and the pivot axes of the link are parallel, including a further link connected between pump and motor pivotable about the pivot axes of the first link, and two hydraulic flow passages extending one through each link and its pivotal connections to form a pair of hydraulic connections between pump and motor.

9. A hydraulic power transmission comprising, in combination with a support, a tilting head pump unit tiltably supported on said support, at least one tilting head motor unit tiltably supported on said support and hydraulically connected to said pump unit for flow of liquid from the pump to the motor unit, a drive shaft for the pump unit rotatably journaled in said support, a driven shaft for the motor unit also rotatably journaled in said support, but in inclined relation to the pump drive shaft, a rigid link of invariable length pivotally connected to each of the pump unit and the motor unit at positions spaced from their respective tilt axes, for simultaneous movement of the two units, and means for tiltably adjusting the tilting heads about their tilt axes.

10. A hydraulic power transmission comprising in combination with a support, a tilting head pump unit tiltably supported on said support, at least two tilting head motor units tiltably supported on said support and each hydraulically connected to said pump unit for flow of liquid from the pump unit to the respective motor units, a drive shaft for the pump unit rotatably journaled in said support, a driven shaft for each motor unit also rotatably journaled in said support, the driven shafts for the motor units being coaxially disposed, rigid links of invariable length each pivotally connected between the pump and a different one of said motor units, at positions spaced from their respective tilt axes, for simultaneous movement of the connected units, and means for tiltably adjusting the tilting heads about their tilt axes.

11. A power transmission unit comprising a first and a second tilting head unit, each including a drive shaft and a tilting head tiltable about a tilt axis intersecting the axis of its drive shaft, means supporting the units with their drive shafts fixed in non-coaxial relationship, the first head being tiltable through a predetermined angular range, means hydraulically interconnecting said units for driving one unit from the other, an adjusting means positively to adjust the angular setting of the first head between the predetermined limits, a rigid link of unvarying length having a first pivotal connection with the first tilting head and a second pivotal connection with the second tilting head, the length of the link and its arrangement relative to the spacing between the two tilting heads being such that within the predetermined angular range of the first tilting head it enters a dead-center position in which a straight line joining the centers of the two pivotal connections lies at right angles to the instantaneous direction of movement of the first pivotal connection, but is incapable of entering a position in which the same straight line lies at right angles to the instantaneous direction of movement of the second pivotal connection, whereby the adjusting means acting directly upon the first head will adjust the same through the dead center position to either side thereof, but acting upon the second head indirectly, through the link, will adjust said second head throughout a range between a position of maximum displacement, corresponding to the first head's position of zero displacement, and a position of minimum displacement, corresponding to the first head's position of maximum displacement, at either side of its position of zero displacement.

12. A power transmission comprising a tilting head pump unit having a drive shaft protruding at one end and a tilting head tiltable about a tilt axis transverse to and intersecting the axis of its drive shaft, between a position of zero displacement wherein the head is coaxial with its drive shaft, and a position of maximum displacement, means so to tilt the head of said pump unit, a tilting head motor unit likewise having a protruding driving shaft and a tilting head tiltable about a similarly related tilt axis, spaced from the tilt axis of the pump head, between positions of maximum and minimum displacement, means supporting the respective drive shafts fixedly in spaced, non-coaxial disposition, conduit means interconnecting said units for transfer of hydraulic fluid therebetween, to drive the motor unit from the pump unit, and a rigid link of unvarying length connected at a first pivot point to the tilting head of the pump unit, and at a second pivot point to the tilting head of the motor unit, the length of the link between its pivot points being such, in relation to the spacing between the tilt axes, and the two pivot points being so located on the respective units, that at the position of zero displacement of the pump unit the motor unit is tilted to a position of maximum displacement, and a line joining the two pivot points of the link passes also through the tilt axis of the pump unit, whereas at the pump unit's position of maximum displacement the motor unit is tilted to a position of minimum displacement greater than zero displacement.

13. A power transmission as in claim 12, wherein the tilting heads of the pump and motor units are located each adjacent the other, with their tilt axes remote.

14. A power transmission as in claim 12, wherein the drive shafts are disposed at right angles to one another.

15. A power transmission as in claim 12, including a second tilting head motor unit also having a protruding drive shaft and a tilting head tiltable about a similarly related tilt axis spaced from the other two tilt axes, between positions of maximum and minimum displacement, means supporting said second motor unit with its drive shaft fixed in spaced, non-coaxial relation at least relative to the pump's unit drive shaft, conduit means similarly interconnecting the pump unit and the second motor unit, and a second rigid link of unvarying length pivotally connected to the pump unit and to the second motor unit at like pivot points and relationship as is the first link to the pump unit and the first motor unit.

16. A power transmission as in claim 15, including a two-part driven shaft, means operatively connecting the respective parts thereof to the first and the second motor units, respectively, to be driven thereby, and locking means operable to interconnect said two parts of the driven shaft.

17. A hydraulic power transmission comprising a tilting head pump unit having a drive shaft and supported for tilting about a tilt axis transverse to its drive shaft axis, between a position of zero displacement and a position of maximum displacement, at least one tilting head motor unit having a drive shaft non-coaxially disposed with relation to the pump unit's drive shaft, and also supported for tilting about a tilt axis transverse to its drive shaft axis, and spaced by a definite distance from the pump unit's tilt axis, between positions of maximum and minimum displacement, means so to tilt one such tilting head, hydraulic conduit means interconnecting the pump unit and the motor unit for driving the motor unit from the pump unit, a rigid link of invariable length pivotally connected to the pump unit's head at a first pivot point, and to the motor unit's head at a second pivot point, for simultaneous tilting of the pump and motor units' heads the length of the link and the location of the two pivot points upon the respective heads being such, in relation to the spacing between the tilt axes that when the pump unit is moving from its position of zero displacement the instantaneous movement of the first pivot is in a direction perpendicular to a line joining the first and second pivot points.

18. A hydraulic power transmission as in claim 17, wherein at the zero displacement position of the pump unit the line joining the first and second pivot points also includes the tilt axis of the pump unit.

19. A power transmission as in claim 17, wherein the tilting heads of the two units are adjacent and their respective tilt axes are remote, each with respect to the other.

20. A power transmission as in claim 17, wherein the pivot points of the link upon the respective heads are at positions remote from the tilt axes of the respective heads, and at a spacing less than the spacing between such tilt axes.

21. A power transmission as in claim 17, including a second similar motor unit having its drive shaft also non-coaxially disposed with relation to the pump unit's drive shaft, and supported for tilting about a tilt axis transverse to its drive shaft axis, and spaced by a definite distance from the pump unit's tilt axis, between positions of maximum and minimum displacement, hydraulic conduit means interconnecting the pump unit and the second motor unit for driving the latter from the pump unit, a second rigid link of invariable length pivotally connected to the pump unit's head and to the second pump unit's head at first and second pivot points corresponding to the first and second pivot points of the first-mentioned link, the length of the second link and the locations of its two pivot points upon the respective heads being such, in relation to the spacing between the tilt axes of the pump unit and the second motor unit, that when the pump unit is moving from its position of zero displacement the instantaneous movement of the first pivot point is in a direction perpendicular to a line joining the first and second pivot points of the second link.

22. A hydraulic power transmission comprising a tilting head pump unit, a tilting head motor unit, hydraulic conduit means interconnecting said pump unit and motor unit, to drive the latter, a support including bearings for tilting of each of the pump and motor units, the tilt bearing for the pump unit being angularly related to the tilt bearing for the motor unit, a rigid link of invariable length pivotally connected to each of the pump unit and the motor unit at positions spaced from their respective tilt axes, shaft bearings in said support for the drive shafts of the respective units relatively arranged in non-coaxial relation one to the other, and means to tilt the heads conjointly about their respective tilt axes.

References Cited in the file of this patent

UNITED STATES PATENTS

| 2,956,407 | Grabow | Oct. 18, 1960 |
| 3,052,098 | Ebert | Sept. 4, 1962 |
| 3,074,296 | Ebert | Jan. 22, 1963 |

FOREIGN PATENTS

| 150,794 | Great Britain | Sept. 6, 1920 |